(12) United States Patent
Gautam et al.

(10) Patent No.: US 9,050,551 B2
(45) Date of Patent: Jun. 9, 2015

(54) SUPERSONIC VENTURI SCRUBBER

(75) Inventors: Vivek Gautam, Bear, DE (US); Magnus Mortberg, Frankfurt (DE); Jan Hagemann, Giessen (DE); Stefan Walter, Griesheim (DE)

(73) Assignees: American Air Liquide, Inc., Fremont, CA (US); Lurgi GmbH, Frankfurt (DE)

( * ) Notice: Subject to any disclaimer, the term of this patent is extended or adjusted under 35 U.S.C. 154(b) by 678 days.

(21) Appl. No.: 13/284,325

(22) Filed: Oct. 28, 2011

(65) Prior Publication Data

US 2013/0104737 A1    May 2, 2013

(51) Int. Cl.
| | |
|---|---|
| *B01D 47/10* | (2006.01) |
| *B01F 5/04* | (2006.01) |
| *B01F 5/06* | (2006.01) |
| *B01F 3/04* | (2006.01) |
| *C10K 1/08* | (2006.01) |
| *B01F 15/02* | (2006.01) |

(52) U.S. Cl.
CPC ............ *B01D 47/10* (2013.01); *B01D 2247/08* (2013.01); *B01F 5/0473* (2013.01); *B01F 5/0655* (2013.01); *B01F 3/04049* (2013.01); *B01F 2015/0221* (2013.01); *C10K 1/08* (2013.01)

(58) Field of Classification Search
None
See application file for complete search history.

(56) References Cited

U.S. PATENT DOCUMENTS

| | | | |
|---|---|---|---|
| 3,490,204 A | * | 1/1970 | Kalika .............. 95/224 |
| 3,620,510 A | | 11/1971 | Longcore |
| 3,957,464 A | * | 5/1976 | Teller .............. 95/196 |
| 3,969,482 A | * | 7/1976 | Teller .............. 423/235 |
| 4,049,399 A | * | 9/1977 | Teller .............. 95/36 |
| 4,086,323 A | | 4/1978 | Moore et al. |

(Continued)

FOREIGN PATENT DOCUMENTS

| | | |
|---|---|---|
| DE | 102007002895 | 7/2007 |
| DE | 102007037860 | 9/2009 |
| DE | 102008049579 | 4/2010 |

(Continued)

OTHER PUBLICATIONS

Sun et al., "Modelling Gas-Liquid Flow in Venturi Scrubbers At High Pressure," Trans IChemE, vol. 81, Part B (Jul. 2003), pp. 250-256.

(Continued)

*Primary Examiner* — Duane Smith
*Assistant Examiner* — Pankti Patel
(74) *Attorney, Agent, or Firm* — Justin K. Murray

(57) ABSTRACT

A method of removing contaminants from a gas stream utilizing a supersonic venturi including a converging section, a throat, and a diverging section is provided. A contaminated gas stream and a scrubbing liquid stream are introduced into the converging section, thereby forming a mixed stream which experiences choked flow upon exiting. The choked mixed stream is introduced into the throat section wherein the scrubbing liquid is contacted with the contaminated gas stream. The contaminated scrubbing liquid stream is removed from the supersonic venture scrubber, and an essentially pure gas stream is removed from the diverging section. A flow modification device may be introduced into the throat section. The flow modification device may be either axially or radially adjustable in order to effect the atomization of the scrubbing liquid and/or the contacting of atomized scrubbing liquid with the contaminated gas stream within the throat section.

17 Claims, 4 Drawing Sheets

(56) References Cited

U.S. PATENT DOCUMENTS 4,483,256 A    11/1984   Brashear
5,205,908 A    4/1993   Stigsson et al.

FOREIGN PATENT DOCUMENTS

| | | |
|---|---|---|
| EP | 0459962 | 12/1991 |
| EP | 1097984 | 5/2001 |
| FR | 2688708 | 9/1993 |
| GB | 1211620 | 11/1970 |
| GB | 1324766 | 7/1973 |
| GB | 1454999 | 11/1976 |

OTHER PUBLICATIONS

Azzopardi, B.J., et al., "An Improved Model for Pressure Drop in Venturi Scrubbers", Process Studies Department, AEA Petroleum Services, Harwell Laboratory, pp. 237-245.

Yung et al., "Performance of Gas-Atomized Spray Scrubbers at High Pressure", Journal of the Air Pollution Control Association, 34, pp. 736-743.

\* cited by examiner

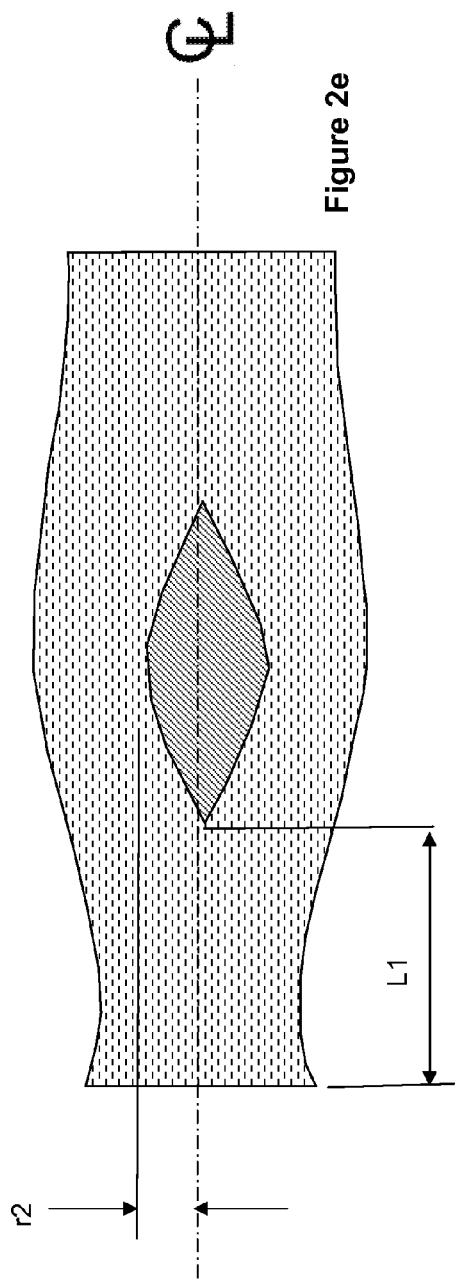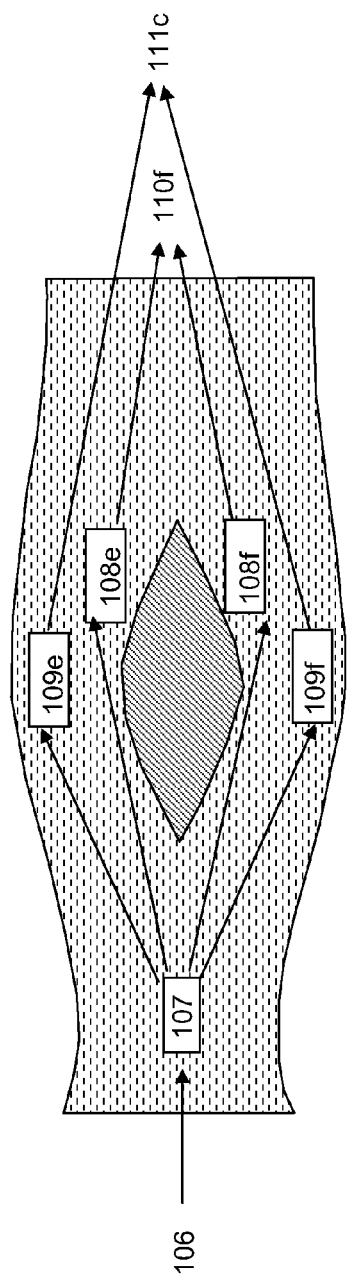

SUPERSONIC VENTURI SCRUBBER

BACKGROUND

Multi Purpose Gasification (MPG) plants are used for production of syngas through gasification of oil, tars and refinery residues. These feed stocks typically contain a lot of inorganic species. As a result of the gasifier operation the raw gas contains about 0.25 percent of soot and other solid compounds. The raw gas is cleaned and cooled in a water quench but despite the intensive cleaning in the quench not all of the solid particles are successfully cleaned out from the raw gas stream.

A venturi scrubber is designed to effectively use the energy from the inlet gas stream to atomize a liquid being used to scrub the gas stream. A typical venturi scrubber consists of three sections: a converging section, a throat section, and a diverging section. The inlet gas stream enters the converging section and, as the area decreases, gas velocity increases. Liquid is introduced either at the throat or at the entrance to the converging section. The inlet gas, forced to move at extremely high velocities in the small throat section, shears the liquid from its walls, producing an enormous number of very tiny droplets. Particle and gas removal occur in the throat section as the inlet gas stream mixes with the fog of tiny liquid droplets. The inlet stream then exits through the diverging section, where it slows down to recover pressure. Particle removal efficiency under certain conditions can reach 99%. However there are still several challenges associated with current venturi scrubber technologies.

For example, there are high pressure losses inside the scrubber. It is well understood that pressure drop increases significantly at higher pressures (~10 bars). Higher the pressure drop inside the scrubber, higher compression energy is required and makes the system energetically inefficient. Also typically the operational pressures go up to 10 bars, with few exceptions known. It is well known that the collection efficiency goes down with increase in operating pressure. Since most of the new gasifiers proposed operate at pressure in excess of 50 bars, the performance of venturi scrubbers is predicted to be even worse. There is insufficient mixing between the gas and liquid at times. There is excessive liquid carryover with high velocity gas. And there is loss of scrubbing performance at operating conditions away from designed conditions. This is because droplet atomization and condensations behaviors change significantly at non-ideal operating conditions.

Venturi scrubbing is a well known and efficient technology offered by equipment suppliers for gasification equipment. Although, the technology is mainly offered for lower pressure ranges and the possibility of having a technology for high pressure and reduced pressure losses would provide substantial benefits to the overall process with reduced need for raw gas compression further downstream. Standard venturi scrubber designs are limited to operating pressures of the gas to be cleaned under 15 bar.

SUMMARY

A method of removing contaminants from a gas stream utilizing a supersonic venturi including converging section 103, throat 104, and diverging section 105 is provided. Contaminated gas stream 101 and scrubbing liquid stream 102*a-e* are introduced into converging section 103, thereby forming mixed stream 106. Mixed stream 106 experiences choked flow 107 upon exiting converging section 103. Choked mixed stream 107 is introduced into throat section 104, wherein scrubbing liquid 102*a-e* is atomized and contacted with contaminated gas stream 101 thereby producing essentially pure gas stream 109 and contaminated scrubbing liquid stream 108. Contaminated scrubbing liquid stream 110*a-f* is removed from supersonic venture scrubber, and essentially pure gas stream 112 is removed from diverging section 105.

In one embodiment, contaminated scrubbing liquid stream 110*a* may be removed from throat 104. Contaminated scrubbing liquid stream 110*b* may be removed from diverging section 105. Contaminated scrubbing liquid stream 110*c* may be removed after exiting diverging section 105.

In one embodiment, scrubbing liquid stream 102*b* may be combined with contaminated gas stream 101 prior to introduction into converging section 103. Scrubbing liquid stream 102*a*, 102*c* may be introduced into converging section 103 independently of contaminated gas stream 101. Scrubbing liquid stream 102*a-c* may be introduced into converging section 103 at a location where MA<1.0. Scrubbing liquid stream 102*a-c* may be introduced into converging section 103 at a location where MA<0.8. Scrubbing liquid stream 102*d-e* may be introduced into converging section 103 at a location where MA=1.0.

Flow modification device 113 may be introduced into throat section 104. Flow modification device 113 may be radially concentric to throat section 104. Flow modification device 113 may be axially adjustable in order to effect the atomization of scrubbing liquid 102*a-e* and/or the contacting of atomized scrubbing liquid 102*a-e* with contaminated gas stream 101 within throat section 104. Flow modification device 113 may be radially adjustable in order to effect the atomization of said scrubbing liquid 102*a-e* and/or the contacting of atomized scrubbing liquid 102*a-e* with contaminated gas stream 101 within throat section 4.

Contaminated gas stream 101 may be introduced into converging section 103 at a pressure between 2 bara and 10 bara. Contaminated gas stream 101 may be introduced into converging section 103 at a pressure between 30 bara and 50 bara. Contaminated gas stream 101 may be introduced into converging section 103 at a pressure greater than 10 bara.

The absolute pressure of essentially pure gas stream 112 exiting diverging section 105 may be greater than 50% of the absolute pressure of contaminated gas stream 101 introduced into converging section 103. The absolute pressure of essentially pure gas stream 112 exiting said diverging section 105 may be greater than 75% of the absolute pressure of contaminated gas stream 101 introduced into converging section 103.

Essentially pure gas stream 112 exiting diverging section 105 may have less than 25% of the contaminants of contaminated gas stream 101 when introduced into converging section 103. Essentially pure gas stream 112 exiting diverging section 105 may have less than 5% of the contaminants of contaminated gas stream 101 when introduced into converging section 103.

BRIEF DESCRIPTION OF THE FIGURES

FIGS. 2*a-f* illustrate various embodiments of the throat section, in accordance with one embodiment of the present invention.

DESCRIPTION OF PREFERRED EMBODIMENTS

Figure 1:
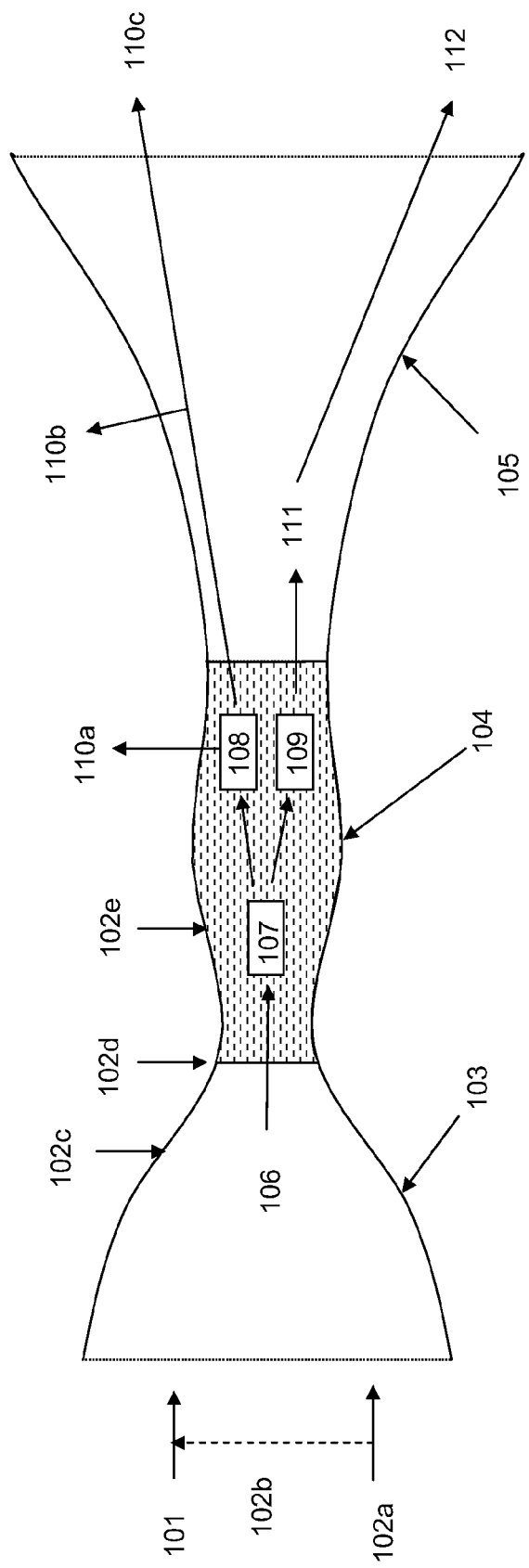
FIG. 1 illustrates an overall supersonic venture scrubber, in accordance with one embodiment of the present invention.
Figure 2A:
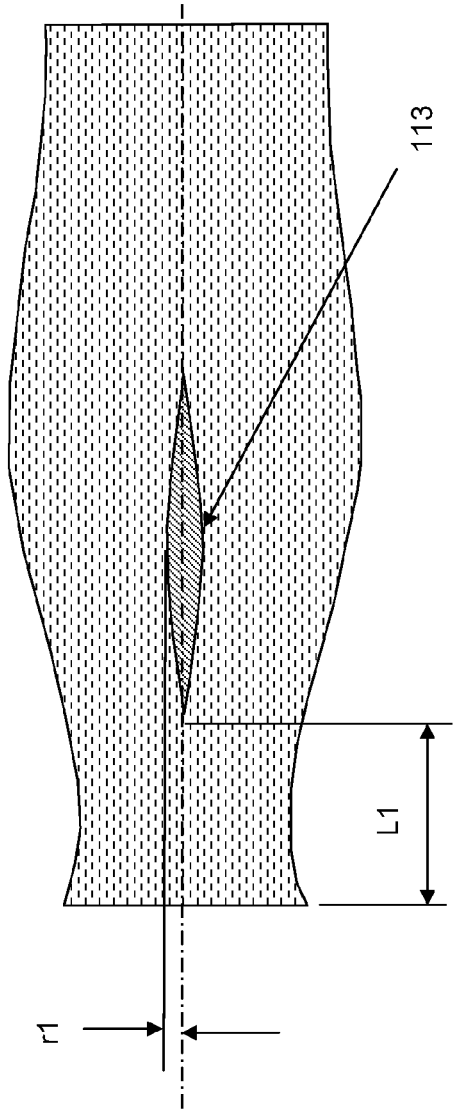
Figure 2B:
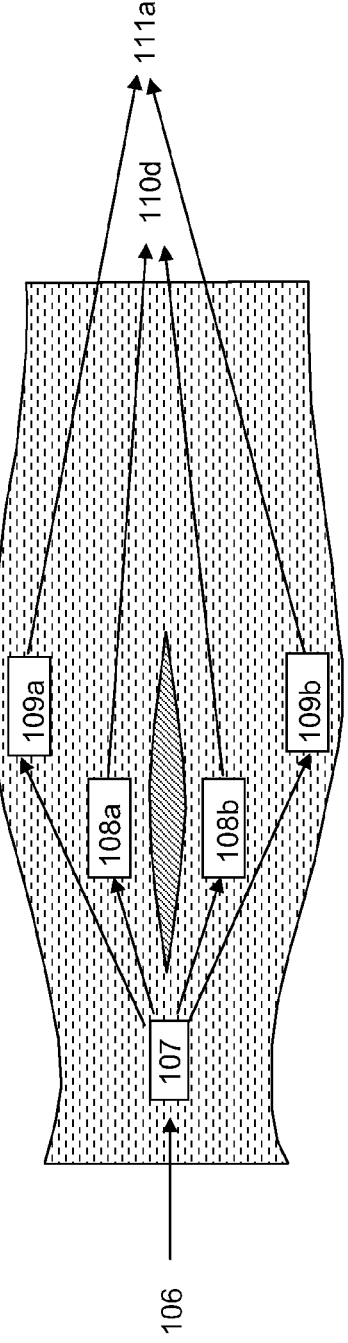
Figure 2C:
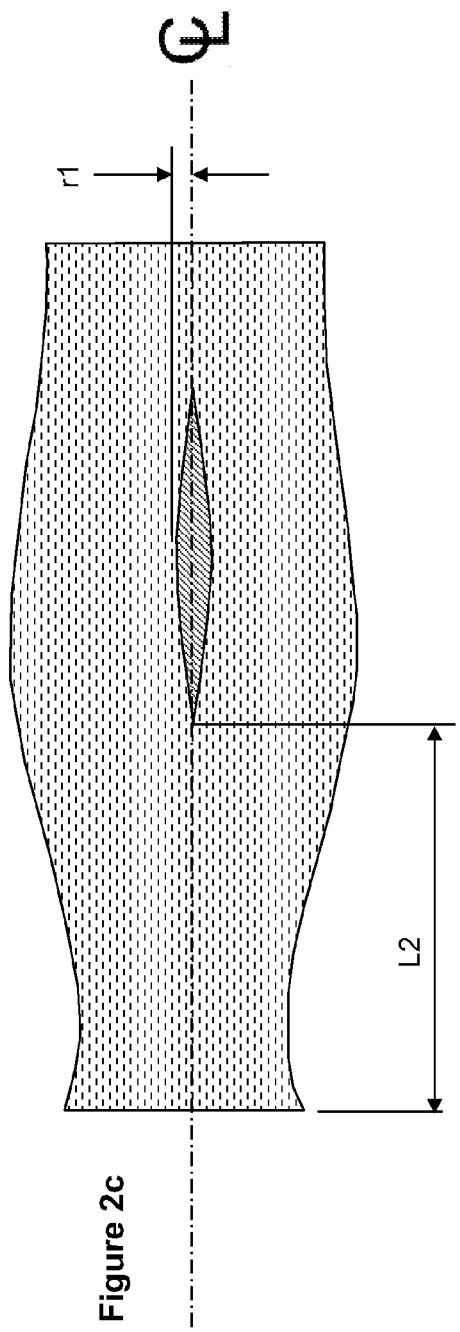
Figure 2D:
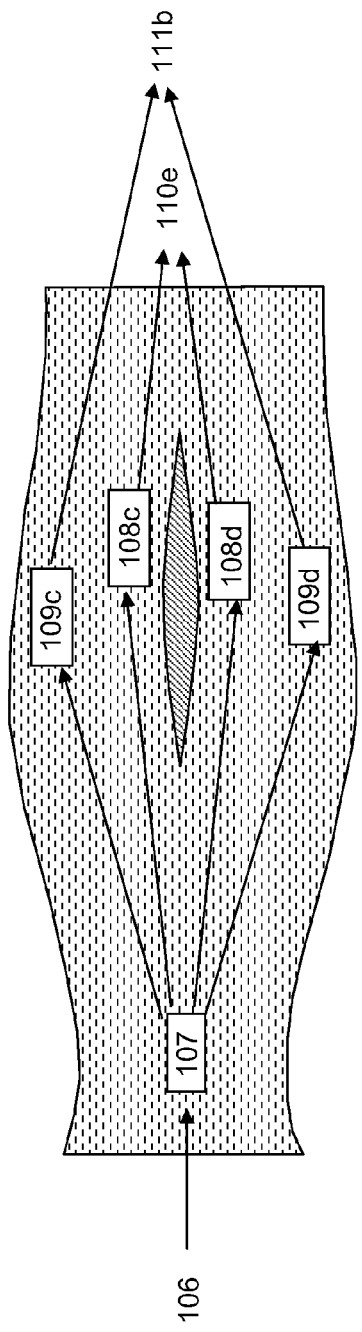

Illustrative embodiments of the invention are described below. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The proposed solutions uses a new design of the classical venturi scrubbers are where the technology is optimised for cleaning effectiveness and minimized pressure losses. The design includes a supersonic converging-diverging nozzle (FIG. 1) which acts as a venturi scrubber. Since ideally designed supersonic nozzles operate isentropically (no total pressure loss) at very high pressures, the high pressure of MPG will be beneficial for this design. The mixing between liquid and gas flow will be greater due to high momentum of the gas flow. Additionally the gas momentum will also be fairly independent of inlet conditions as the flow will always be sonic at the throat when it is choked.

The challenging part of the supersonic scrubber design will be minimising pressure losses during pressure recovery as supersonic flows are more prone to losses associated with shock waves especially under non-ideal conditions. In order to minimize pressure losses, the supersonic venturi design will also include an adjustable diffuser design (FIGS. 2a-f) for recovering pressure. A diffuser designed to reduce the velocity and increase the pressure of fluid moving at supersonic velocities. Air enters at a velocity greater than the speed of sound, is decelerated in a contracting section, and reaches sonic speed at the throat. Typically supersonic diffuser systems can be classified into three basic types:

1. External-compression inlets have the supersonic diffusion taking place at or ahead of the cowl lip or throat station and generally employ one or more oblique shock waves ahead of the normal shock.
2. Internal-compression inlets accomplish supersonic diffusion internally downstream of the cowl lip. Deceleration of the flow is produced by a number of weak reflecting waves in a gradually convergent channel.
3. A combination of external and internal compression, it is an effective compromise. It generally employs one or more oblique shock waves ahead of the normal shock.

For venturi scrubber applications the diffuser will be of internal compression type for safety purposes. The new design will achieve greater than 95% collection efficiency and less than 25% pressure drop.

Turning now to FIG. 1, a method of removing contaminants from a gas stream utilizing a supersonic venturi scrubber is illustrated. The supersonic venture scrubber includes converging section 103, throat 104, and diverging section 105. Contaminated gas stream 101 and scrubbing liquid stream 102a-e are introduced into converging section 103, thereby forming mixed stream 106. Mixed stream 106 experiences choked flow 107 upon exiting converging section 103. Choked mixed stream 107 is introduced into throat section 104, wherein scrubbing liquid 102a-e is atomized and contacted with contaminated gas stream 101 thereby producing essentially pure gas stream 109 and contaminated scrubbing liquid stream 108. Contaminated scrubbing liquid stream 110a-f is removed from supersonic venture scrubber, and essentially pure gas stream 112 is removed from diverging section 105.

In one embodiment, contaminated scrubbing liquid stream 110a may be removed from throat 104. Contaminated scrubbing liquid stream 110b may be removed from diverging section 105. Contaminated scrubbing liquid stream 110c may be removed after exiting diverging section 105.

In one embodiment, scrubbing liquid stream 102b may be combined with contaminated gas stream 101 prior to introduction into converging section 103. Scrubbing liquid stream 102a, 102c may be introduced into converging section 103 independently of contaminated gas stream 101. Scrubbing liquid stream 102a-c may be introduced into converging section 103 at a location where MA<1.0. Scrubbing liquid stream 102a-c may be introduced into converging section 103 at a location where MA<0.8. Scrubbing liquid stream 102d-e may be introduced into converging section 103 at a location where MA=1.0.

Flow modification device 113 may be introduced into throat section 104. Flow modification device 113 may be radially concentric to throat section 104. Flow modification device 113 may be axially adjustable in order to effect the atomization of scrubbing liquid 102a-e and/or the contacting of atomized scrubbing liquid 102a-e with contaminated gas stream 101 within throat section 104. Flow modification device 113 may be radially adjustable in order to effect the atomization of said scrubbing liquid 102a-e and/or the contacting of atomized scrubbing liquid 102a-e with contaminated gas stream 101 within throat section 4.

Contaminated gas stream 101 may be introduced into converging section 103 at a pressure between 2 bara and 10 bara. Contaminated gas stream 101 may be introduced into converging section 103 at a pressure between 30 bara and 50 bara. Contaminated gas stream 101 may be introduced into converging section 103 at a pressure greater than 10 bara.

The absolute pressure of essentially pure gas stream 112 exiting diverging section 105 may be greater than 50% of the absolute pressure of contaminated gas stream 101 introduced into converging section 103. The absolute pressure of essentially pure gas stream 112 exiting said diverging section 105 may be greater than 75% of the absolute pressure of contaminated gas stream 101 introduced into converging section 103.

Essentially pure gas stream 112 exiting diverging section 105 may have less than 25% of the contaminants of contaminated gas stream 101 when introduced into converging section 103. Essentially pure gas stream 112 exiting diverging section 105 may have less than 5% of the contaminants of contaminated gas stream 101 when introduced into converging section 103.

What is claimed is:

1. A method of removing contaminants from a gas stream utilizing a supersonic venturi scrubber comprising a converging section, a throat, and a diverging section, the method comprising the steps of
    introducing a contaminated gas stream at a velocity below the speed of sound into said converging section;
    introducing the contaminated gas stream in the presence of a scrubbing liquid into said throat section to form a mixed stream under conditions to produce choked flow;
    flowing the mixed stream out of the throat section and into the diverging section thereby increasing the velocity of the mixed stream to be above the speed of sound, wherein said scrubbing liquid is atomized and contacted with said contaminated gas stream thereby producing an essentially pure gas stream and a contaminated scrubbing liquid stream, wherein there is a diffuser disposed within the diverging section, the diffuser configured to be adjustable within the diverging section, wherein the diffuser is configured to reduce the pressure drop experienced by the mixed stream within the diverging section as compared to the diverging section having an absence of the diffuser;

removing said contaminated scrubbing liquid stream from said supersonic venture scrubber; and introducing said essentially pure gas stream said diverging section.

2. The method of claim 1, wherein said contaminated scrubbing liquid stream is removed from the throat.

3. The method of claim 1, wherein said contaminated scrubbing liquid stream is removed from the diverging section.

4. The method of claim 1, wherein said contaminated scrubbing liquid stream is removed after exiting the diverging section.

5. The method of claim 1, wherein said scrubbing liquid is combined with said contaminated gas stream prior to introduction into said converging section.

6. The method of claim 1, wherein said scrubbing liquid is introduced into said converging section independently of said contaminated gas stream.

7. The method of claim 6, wherein said scrubbing liquid is introduced into said converging section at a location where MA<1.0.

8. The method of claim 6, wherein said scrubbing liquid is introduced into said converging section at a location where MA<0.8.

9. The method of claim 1, wherein the diffuser is axially adjustable.

10. The method of claim 1, wherein the diffuser is radially adjustable.

11. The method of claim 1, wherein said contaminated gas stream is introduced into said converging section at a pressure between 2 bara and 10 bara.

12. The method of claim 1, wherein said contaminated gas stream is introduced into said converging section at a pressure between 30 bara and 50 bara.

13. The method of claim 1, wherein said contaminated gas stream is introduced into said converging section at a pressure greater than 10 bara.

14. The method of claim 1, wherein the absolute pressure of said essentially pure gas stream exiting said diverging section is greater than 50% of the absolute pressure of said contaminated gas stream introduced into said converging section.

15. The method of claim 1, wherein the absolute pressure of said essentially pure gas stream exiting said diverging section is greater than 75% of the absolute pressure of said contaminated gas stream introduced into said converging section.

16. The method of claim 1, wherein the essentially pure gas stream exiting said diverging section has less than 25% of the contaminants of said contaminated gas stream when introduced into said converging section.

17. The method of claim 1, wherein the essentially pure gas stream exiting said diverging section has less than 5% of the contaminants of said contaminated gas stream when introduced into said converging section.

\* \* \* \* \*